United States Patent Office 2,894,788
Patented July 14, 1959

2,894,788
HANDLING OF SODIUM DISPERSIONS

William R. Birchall, Sharonville, and Lloyd M. Watson, Cincinnati, Ohio, assignors to National Distillers and Chemical Corporation, New York, N.Y., a corporation of Virginia No Drawing. Application October 22, 1956
Serial No. 617,219

6 Claims. (Cl. 302—66)

The present invention relates to a method for the handling of metallic sodium for requirements wherein it is desired to continuously pump finely divided sodium at a controlled rate at a temperature below the melting point of sodium without substantially changing and, more important, without substantially increasing the particle size characteristics of the finely divided sodium.

In certain requirements in the art of handling and use of sodium, it is important that the sodium be used in the form of finely divided particles of controlled particle size characteristics whereby the dispersion should be maintained without substantial change in particle size characteristics during handling and up to its ultimate use. For example, following preparation of sodium in finely divided form, such as a dispersion of sodium in a suitable liquid dispersant, it is often necessary to transfer the dispersion through conduits from vessel to vessel, from comminuting means in which the dispersion is prepared to a reaction zone in which the sodium is utilized as a reactant, from comminuting means to storage facilities, and the like. Additionally, and particularly in continuous processes utilizing finely dispersed sodium as a reactant, it is of considerable importance that the finely dispersed sodium be supplied continuously at a controlled, substantially constant rate to the reaction zone.

When sodium dispersions are utilized at a temperature above the melting point of sodium, the dispersions can be handled by conventional mechanical pumps of many types when it is necessary to transfer the dispersion. However, when it is desirable or necessary to transfer the sodium dispersion at a temperature below the melting point of sodium, such as when it is necessary to supply the sodium dispersion to a reaction zone wherein a reaction with sodium must be carried out at a temperature below the melting point of sodium, it has been found that mechanical pumping means are not suitable for finely divided sodium dispersions in which the sodium particles have a particle size even as low as ten microns. For example, in carrying out certain chemical reactions, such as a reaction wherein an olefin such as butadiene is reacted with finely divided sodium to form disodiooctadienes and which reaction must be carried out at a temperature substantially below the melting point of sodium, it is essential that the sodium be in finely dispersed form and, for continuous operation, that the sodium be supplied to the reaction at a controlled substantially uniform rate. Obviously, it is further essential for such a reaction that, in conveying the dispersion from its point of manufacture or supply, the desired particle size characteristics of the dispersion should not be substantially altered when the dispersion is subjected to a compressive force (e.g., pumping) during its conveyance. In extensive studies carried out with sodium dispersions, it has been found that when such dispersions of sodium particles even as low as ten microns in size are subjected to a pumping operation at a temperature below the melting point of sodium, the particles coalesce due to the tendency of sodium particles to smear together whereby the pumps fail and, in most cases, within a few seconds or minutes. Thus, the sodium dispersion fed to the pumping operation is not only objectionably increased in particle size characteristics but, obviously, the desired continuity of feed from the pump at a controlled rate without substantial change in particle size characteristics is precluded.

In order to illustrate the difficulties encountered with sodium dispersions at a temperature below the melting point of sodium, and even when the sodium particles are as small in size as ten microns, the following tabulation sets forth the results obtained in the use of a wide variety of mechanical pumps in the attempted metering of sodium (10 micron) dispersed in the amount and in the dispersant shown in the tabulation. The tests for which results are shown were carried out at room temperature. In all cases, the pumps failed within a few seconds or minutes after the dispersion was fed.

| Run No. | Pump Type | Manufacturer | Dispersion | | Results |
|---|---|---|---|---|---|
| | | | Liquid | Sodium, Percent | |
| 1 | Piston | Milton Roy [a] | Kerosene | 50 | Plugged by sodium lumps on valve seats. |
| 2 | Gear | Zenith [b] | Nujol | 30 | Sodium plugged teeth and pump stalled. |
| | do | Viking [c] | | | Sodium plugged teeth. |
| 3 | Rotary (sliding vane) | Research [d] Division | Kerosene | 50 | Vanes frozen into rotor, pump cavity filled with sodium. |
| 4 | Rotary | Eco [e] | do | 50 | Sodium packed impellers and bound pump. |
| 5 | Centrifugal (open impeller) | Oberdorfer [f] | do | 50 | Build-up of sodium jammed pump. |
| 6 | do | do [f] | do | 50 | Sodium jammed pump. Impeller blades bridged with sodium. |

[a] Milton Roy Company, Philadelphia, Pa.
[b] Zenith Products, West Newton, Mass.
[c] Viking Pump Co., Cedar Falls, Iowa.
[d] National Distillers Chemical Company.
[e] Eco Engineering Company, Newark, N.J.
[f] Oberdorfer Foundries, Inc., Syracuse, N.Y.

The present invention is based on the discovery that if a sodium dispersion is prepared by comminution of metallic sodium to particles that do not exceed about ten microns in size and an average particle size of not more than about five microns, the dispersion can be subjected to compressive force such as by mechanical pumping at a temperature below the melting point of sodium whereby the dispersion can be continuously pumped over a considerable period of time without substantially changing the particle size characteristics of the dispersion. Thus, by practice of this invention, it is possible to supply sodium dispersions by pumping operations in continuous manner and at controlled rates without substantial change in the particle size of the sodium fed to the pumping operation.

In order to further describe the invention, by way of illustration and not limitation, the following embodiments are set forth. For such embodiments, the sodium dispersion was prepared as follows:

An inert hydrocarbon ($C_{12}$ alkylate) was placed in a vessel with an appropriate amount of sodium metal and the mixture was heated until the sodium melted (M.P. 97.5° C.). A high speed agitator was started and an emulsifying agent (aluminum distearate) was added in an amount of two weight per cent based on the sodium. After a short period of agitation, the resulting sodium dispersion had a particle size in the range of five to forty microns.

A homogenizer mill was preheated by placing a small amount of the inert hydrocarbon in the retention pot and running the mill until the liquid reached a temperature in the range of 230 to 250° C. When such a temperature was reached, the five to forty micron dispersion was added to the retention pot while the mill was continued in operation. The amount of the liquid hydrocarbon initially added to form the five to forty micron dispersion and the amount used for preheating the homogenizer were calibrated to provide a 25% sodium dispersion. By the described process a dispersion was obtained which had an average particle size of about one-half to one micron and substantially devoid of particles over about four microns, determined by visual examination with a microscope having a calibrated eyepiece.

A portion of the 25% sodium dispersion and a portion diluted with alkylate to 4% sodium content of the aforesaid particle size characteristics was cycled (at 70° to 30° F.) through a centrifugal pump for a total of 24 hours and another portion through a screw pump. After each 8 hour period, the dispersion was tested for particle size and the pumps inspected for sodium build-up. Discharge pressures that were reached were 27 p.s.i.g for the screw pump and 10 p.s.i.g. for the centrifugal pump. Both pumps operated satisfactorily at a feed rate of 4 g.p.h. for the screw pump and 60 g.p.h. for the centrifugal pump for the entire test period. The dispersions at the end of 8 hours of pumping had an average particle size of one micron and a maximum size of six microns and remained unchanged for the remainder of the 24 hour period. Neither pump showed any sodium build-up at the end of the test period. Similar results were obtained from runs made at temperatures from 60° to 150° F. and at pressures from atmospheric to 60 p.s.i.g.

As is apparent from the foregoing data, the discovery on which this invention is based permits the continuous operation of readily available conventional mechanical pumps for handling sodium dispersions and, in addition, the handling of dispersions such that they can be supplied at a controlled rate without substantial change in particle size characteristics. The discovery provides, therefore, a marked advance in the art of sodium handling that substantially increases the commercial outlets and usages for sodium in finely divided form.

Although for the foregoing embodiments, the sodium was dispersed in a specific liquid hydrocarbon ($C_{12}$ alkylate) the dispersions for practice of this invention may be prepared in other inert liquids, examples of which include dibutyl ether, n-octane, isooctane, toluene, xylene, naphthalene, n-heptane, straight run kerosenes, etc.

Similarly, and although aluminum distearate was specifically employed as an emulsifying agent for preparation of the dispersion, other emulsifying agents can be used, examples of which include dimers of linoleic acid, metallic salts of oleic acid and of stearic, of pelargonic, etc. and, usually, in amounts of from about one to about 3% based on the weight of sodium.

Generally speaking, the concentration of sodium in the dispersion employed for practice of this invention can be varied over a rather wide range but, preferably from about 15 to about 50% by weight of sodium with a more preferred range being from 20 to 40%. In addition to dispersion preparation by a two-step procedure with dispersion units as aforedescribed, other dispersion units, including those of the ultrasonic type may be used with either a preformed dispersion or molten sodium feed.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A method for transporting finely divided sodium at a temperature below the melting point of sodium without substantially increasing the particle size characteristics of the finely divided sodium which comprises mechanical pumping said finely divided sodium as a dispersion in an inert liquid medium in which the average particle size of the sodium particles does not exceed about five microns and substantially devoid of sodium particles exceeding about ten microns.

2. A method, as defined in claim 1, wherein the dispersion of sodium particles has an average particle size of about one-half to about one micron and is substantially devoid of particles over about four microns.

3. A method, as defined in claim 1, wherein the sodium particles are dispersed in a liquid hydrocarbon.

4. A method for transporting finely divided sodium at a temperature below the melting point of sodium through a confined conduit without substantially increasing the particle size characteristics of the finely divided sodium which comprises providing a sodium dispersion in an inert liquid medium in which the average particle size of the dispersed sodium does not exceed about five microns and substantially devoid of sodium particles exceeding about ten microns, and mechanically pumping said dispersion to transfer said dispersion without substantially increasing the particle size characteristics of the finely divided sodium.

5. A method, as defined in claim 4, wherein the sodium dispersion is mechanically pumped by a centrifugal pump.

6. A method, as defined in claim 4, wherein the sodium dispersion is mechanically pumped by a screw pump.

References Cited in the file of this patent

UNITED STATES PATENTS

| 1,390,230 | Bates | Sept. 6, 1921 |
| 2,128,913 | Burk | Sept. 6, 1938 |
| 2,610,900 | Cross | Sept. 16, 1952 |